Figure 4:
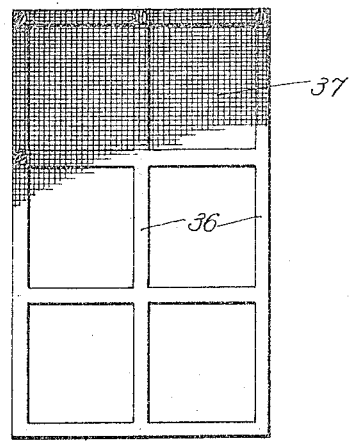

F. E. GETTS.
LIQUID STRAINER.
APPLICATION FILED JULY 12, 1913.
1,130,725.
Patented Mar. 9, 1915.
2 SHEETS—SHEET 1.
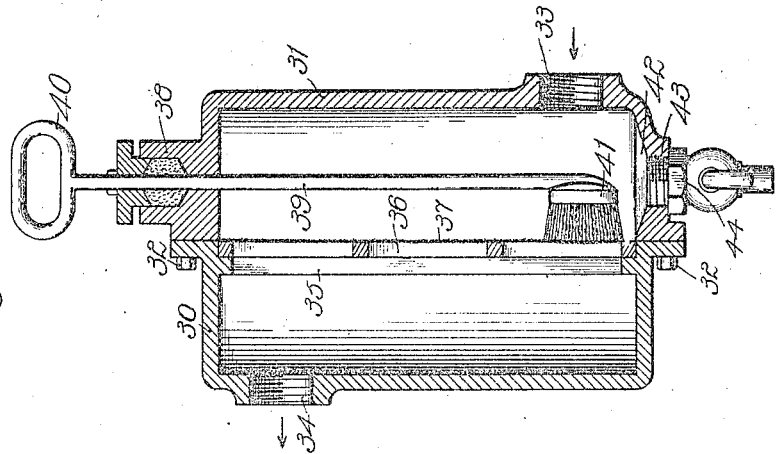
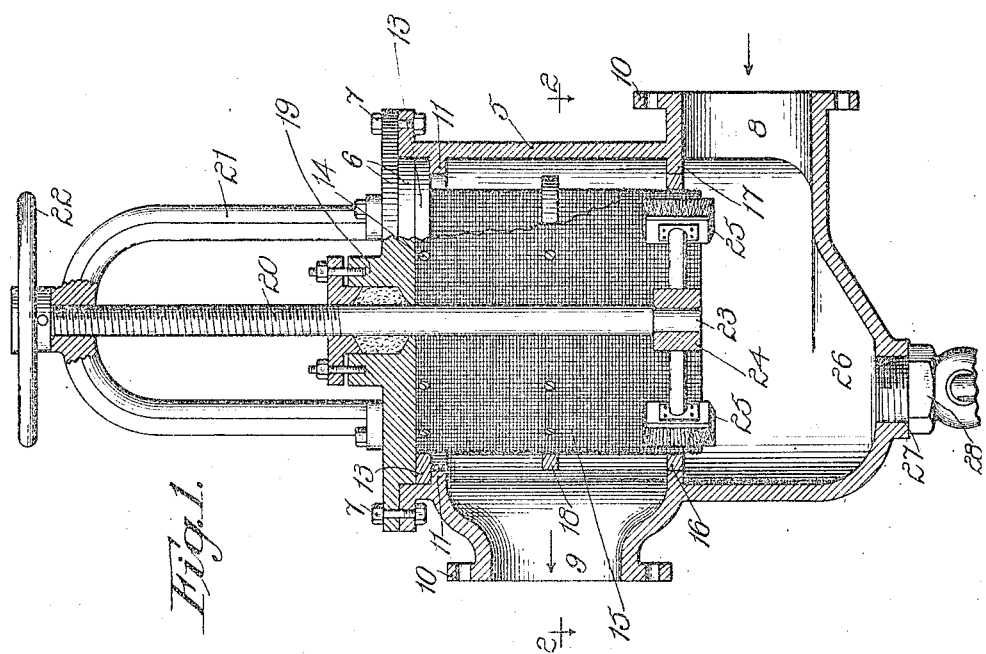
Witnesses:
Robert F. Bracke
August H. Arndt
Inventor
Frank E. Getts
By Brown Williams Bell Hanson & Boettcher
Attorneys

UNITED STATES PATENT OFFICE.

FRANK E. GETTS, OF CHICAGO, ILLINOIS.

LIQUID-STRAINER.

1,130,725.   Specification of Letters Patent.   Patented Mar. 9, 1915.

Application filed July 12, 1913.   Serial No. 778,628.

*To all whom it may concern:*

Be it known that I, FRANK E. GETTS, a citizen of the United States, residing at Chicago, county of Cook, and State of Illinois, have invented a certain new and useful Improvement in Liquid-Strainers, of which the following is a full, clear, concise, and exact description, reference being had to the accompanying drawings, forming a part of this specification.

My invention relates to liquid strainers and its object is to provide a device of this class which is of durable construction, efficient, and one which may be economically manufactured.

Broadly, the device of my invention comprises a suitable casing provided with inlet and outlet openings. Carried by the casing and located in the path of liquid passed through the casing, is a suitable screen of sufficiently fine mesh to intercept all particles contained in the liquid that it is desirable to have separated from the liquid. This screen may be a flat wire screen stretched directly across the path of the liquid passed through the casing, or it may be generally cylindrical in shape, in order to secure a maximum amount of effective screen surface.

I have found that the screen which forms a part of my liquid strainer frequently becomes clogged with dirt separated from the strained liquid. When the screen becomes so clogged, it of course seriously impedes the flow of liquid through the casing, and moreover, does not perform its function as effectually as it otherwise would. In order to avoid the difficulties experienced heretofore in the use of strainers of the general class to which my invention relates, I provide my liquid strainer with a cleaning device, preferably in the form of a bristle brush, for cleaning the side of the screen nearest the inlet opening. The brush is normally disposed against the strainer screen and is provided with suitable operating means extending through the casing, whereby said brush may be operated to clean the entire surface of the screen. The strainer casing is so conformed as to provide a dirt pocket in the lower portion thereof. When the brush is operated to clean the screen, the dirt that is removed from the screen collects in this dirt pocket and is blown from the casing through a suitable blow-off opening through the casing at this point. This blow-off opening is normally closed by means of a suitable valve or other equivalent means.

These and other features of the liquid strainer of my invention are set forth in more detail in the following description, and are illustrated in the accompanying drawings in which—

Figure 2:
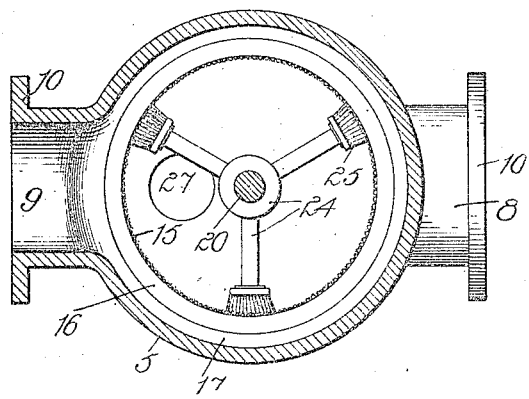

Figure 1 is a vertical sectional view of the strainer of my invention, Fig. 2, is a cross sectional view thereof, taken on line 2—2, of Fig. 1. Fig. 3 illustrates a modified form of liquid strainer embodying my invention, and Fig. 4 is a detail view of the the strainer screen and support therefor shown in vertical section in Fig. 3.

Similar reference numerals refer to similar parts throughout the several views.

The embodiment of my invention illustrated in Figs. 1 and 2, comprises a casing 5 having a cap 6, clamped thereto by means of bolts 7, as shown. This casing 5 is provided with a suitable inlet opening 8, and an outlet opening 9, which openings are preferably on diametrically opposite sides of the casing. The casing 5 is provided with suitable annular flanges 10 at the inlet and outlet openings for connection with suitable pipes in a manner well known to those skilled in the art. The upper portion of the casing 5 is provided with an annular shoulder 11 upon which rests a ring 13, this ring being securely clamped between the shoulder 11 and the cap 6 of the casing. Secured to the inside of the ring 13 by means of suitable screws 14, or other fastening means, is a wire screen 15, as shown. The lower end of the screen 15 is provided with a ring 16, which encircles the same and is secured thereto. This ring 16 rests against an annular shoulder 17 with which the inside of the casing 5 is provided. The screen 15 is preferably provided with a center frame ring 18 for the purpose of preserving the circular cross section of the screen.

It is evident from the above description that liquid entering the casing 5 through the inlet 8 must pass through the screen 15, before it can escape through the outlet 9. Thus the screen 15 intercepts the dirt carried by the liquid passed through the casing and permits only cleaned liquid to leave the outlet 9.

I have found that as liquid passes through the screen, dirt collects upon the inner surface of the screen and tends to clog the same. When the screen becomes so clogged with dirt, it of course impedes to a very great extent the passage of liquid through the strainer casing and moreover, does not as effectually separate the particles of dirt from the liquid as it would if the screen were not so clogged. In order to clean the inside of the screen when it becomes so clogged with dirt, a suitable cleaning device carried at the inner end of a stem extends through the strainer casing and at the outer end of the stem I provide suitable means for imparting a simultaneous rotary and longitudinal movement to said stem.

Extending through a stuffing box 19, in the cap 6, is a stem 20 which has threaded engagement with a yoke 21 mounted upon the top of cap 6. At its upper end the stem 20 carries a suitable hand wheel 22, as shown. As is clearly shown in the drawings, the stem 20 is disposed coaxially with the cylindrical screen 15. At its lower end the stem is provided with a reduced portion 23 and upon this reduced portion 23 is secured the hub of a spider 24. Mounted upon each of the legs of the spider and engaging the inner surface of the screen 15, is a suitable bristle brush 25. It is evident from the drawings that when the hand wheel 22 is rotated, the stem 20 and brushes 25 are consequently rotated, and moreover, that the stem is moved longitudinally of its axis on account of its threaded engagement with the yoke 21, thus, I am enabled by simply rotating the hand wheel 22 to clean the inner surface of the screen.

As is clearly shown in Fig. 1, the casing 5 is conformed to provide a suitable dirt pocket or well 26, which is located below the screen 15. It is evident that when the brushes 25 are operated to clean the inner surface of the screen, that the dirt removed from the screen will drop into the dirt well 26. The dirt pocket or well 26 is provided with a suitable blow-off opening 27, which is normally closed by means of a valve or other suitable means illustrated at 28. When a considerable amount of dirt has accumulated in the dirt pocket or well, the same may be readily removed by simply opening the valve 28, whereupon the liquid entering the inlet 8 serves to blow the accumulated dirt through the opening 27.

The embodiment of my invention shown in Figs. 3 and 4, comprises a casing consisting of two members 30 and 31 clamped together by means of bolts 32. The casing is provided with suitable inlet and outlet openings, shown at 33 and 34, respectively. The member 30 is provided with an inwardly projecting shoulder 35 against which rests a screen frame 36 as shown, this screen frame being secured in position by any suitable means. Carried by the frame 36, is a suitable wire screen 37, which is similar to the screen shown in Figs 1 and 2, except that in the present instance, the screen is flat instead of cylindrical in shape. The upper portion of the casing is provided with a suitable stuffing box 38, through which extends a rod 39, provided at its upper end with a suitable handle 40. At its lower end the rod is provided with a suitable bristle brush 41, which engages the side of the screen 37 nearest the inlet opening 33. The brush 41 is, of course, operated to clean the screen 37 by moving the rod 39 up and down. Located in the lower portion of the casing is a suitable dirt pocket or well 42 provided with a blow-off opening 43 and a closure 44 in the form of a valve. The screen frame 36 shown in detail in Fig. 4, comprises a substantially rectangular frame provided with suitable cross pieces, as shown.

While I have referred to the strainer of my invention as a liquid strainer, it is, of course, evident that my strainer may be employed for cleaning fluids of all kinds whatsoever, whether they be gases or liquids. Moreover, while I have illustrated my invention in the particular embodiments herein shown and described, I do not limit myself to these particular constructions, but desire to claim any equivalents thereof which may suggest themselves to those skilled in the art.

What I claim as new and desire to secure by Letters Patent of the United States, is:

A liquid strainer comprising a casing having inlet and outlet passages and a blow off passage, a thin cylindrical wire screen in said casing interposed between said inlet and outlet, a plurality of small substantially rectangular brushes bearing on the interior of said screen and disposed at a plurality of substantially equidistant points lying substantially in the same plane on the interior of said screen, a spider having a plurality of arms for supporting said brushes, a screw threaded yoke attached to said casing, a screw threaded shaft passing through said yoke and casing, and secured to said spider, said shaft having motion axially sufficient to move each of said brushes substantially the full length of the screen, and a hand wheel for rotating said shaft.

In witness whereof, I hereunto subscribe my name this 10th day of July, A. D. 1913.

FRANK E. GETTS.

Witnesses:
 ALBERT G. McCALEB,
 LEONARD E. BOGUE.